United States Patent
Riedel, Jr. et al.

(10) Patent No.: US 11,859,757 B2
(45) Date of Patent: Jan. 2, 2024

(54) FLUID CONDUITS WITH SELECTIVELY COATED SURFACES

(71) Applicant: Caterpillar Inc., Peoria, IL (US)

(72) Inventors: Robert E. Riedel, Jr., Fox River Grove, IL (US); Christian Joseph Murray, Cypress, TX (US); Nickolas Jay Gretz, Lake in the Hills, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 17/247,256

(22) Filed: Dec. 4, 2020

(65) Prior Publication Data

US 2022/0178490 A1 Jun. 9, 2022

(51) Int. Cl.
*F16L 57/06* (2006.01)
*F16L 19/025* (2006.01)
*F16L 19/02* (2006.01)
*E21B 43/26* (2006.01)

(52) U.S. Cl.
CPC ............. *F16L 57/06* (2013.01); *F16L 19/025* (2013.01); *F16L 19/0243* (2013.01); *E21B 43/2607* (2020.05)

(58) Field of Classification Search
CPC ..... F16L 19/0243; F16L 19/025; F16L 57/06; F16L 58/184
See application file for complete search history.

(56) References Cited

U.S. PATENT DOCUMENTS

| 3,100,656 A | * | 8/1963 | Macarthur | ............ F16L 15/002 |
| | | | | 285/55 |
| 3,113,792 A | * | 12/1963 | Brown | ................ F16L 19/0231 |
| | | | | 285/388 |
| 3,877,730 A | * | 4/1975 | Frantz | ..................... F16L 55/18 |
| | | | | 285/55 |
| 4,474,381 A | * | 10/1984 | Wilkins | .................. F16L 23/18 |
| | | | | 285/15 |

(Continued)

FOREIGN PATENT DOCUMENTS

| CN | 201377673 Y | 1/2010 |
| CN | 106885068 A | 6/2017 |

(Continued)

OTHER PUBLICATIONS

ASB, Sep. 22, 2020, "HVOF Tungsten Carbide Coatings", https://web.archive.org/web/20200922144349/https://www.asbindustries.com/tungsten-carbide-coatings.*

(Continued)

*Primary Examiner* — Matthew Troutman
*Assistant Examiner* — Alexander T Rufrano

(57) ABSTRACT

A fluid conduit system a first conduit section having a first conduit bore extending from a first end of the first conduit section to a second end of the first conduit section, the first conduit bore including a first beveled surface proximate the first end of the first conduit section. The fluid system also includes a second conduit section coupled to the first conduit section and having a second conduit bore extending from a first end of the second conduit section to a second end of the (Continued)

second conduit section, the second conduit bore including a second beveled surface proximate the first end of the second conduit section. The fluid system further includes a coating applied to the first beveled surface and to the second beveled surface.

20 Claims, 8 Drawing Sheets

(56) References Cited

U.S. PATENT DOCUMENTS

| | | | | |
|---|---|---|---|---|
| 4,605,248 | A * | 8/1986 | Goldsmith | F16L 25/023 |
| | | | | 285/354 |
| 5,678,607 | A * | 10/1997 | Krywitsky | F16L 55/1152 |
| | | | | 138/96 T |
| 6,945,569 | B1 * | 9/2005 | Diaz | F16L 19/025 |
| | | | | 285/388 |
| 8,118,528 | B2 * | 2/2012 | Herndon | F16L 19/0231 |
| | | | | 411/432 |
| 8,356,843 | B2 * | 1/2013 | Lockwood | F16J 15/0881 |
| | | | | 285/354 |
| 8,657,547 | B2 * | 2/2014 | Herndon | F16L 19/0231 |
| | | | | 411/432 |
| 10,072,777 | B2 * | 9/2018 | Vigre | F16L 19/025 |
| 10,288,178 | B2 | 5/2019 | Nowell et al. | |
| 10,533,392 | B2 | 1/2020 | Walton et al. | |
| 10,808,871 | B2 * | 10/2020 | Nguyen | F16L 19/0206 |
| 2018/0216431 | A1 | 8/2018 | Walton, III et al. | |
| 2019/0137019 | A1 * | 5/2019 | Nowell | F16L 27/0828 |

FOREIGN PATENT DOCUMENTS

| | | | |
|---|---|---|---|
| CN | 108842126 | 7/2020 | |
| CN | 111500159 A | 8/2020 | |
| CN | 211399015 U | 9/2020 | |
| WO | WO-2021222329 A1 * | 11/2021 | F16L 21/065 |

OTHER PUBLICATIONS

UK Search Report for Int'l. Patent Appln. No. GB2117212.7, dated May 20, 2022 (4 pgs).

* cited by examiner

FLUID CONDUITS WITH SELECTIVELY COATED SURFACES

TECHNICAL FIELD

The present disclosure relates to conduits for fluid systems. More specifically, the present disclosure relates to a coating that is applied to certain portions of hydraulic fracturing conduit to improve the durability of the conduit, as well as reduce required maintenance during the usable life of the conduit.

BACKGROUND

Various types of fluid conduit are in widespread use in a variety of industries. For example, fluid conduit is used in a variety of applications in the oil and gas extraction industry. One such application includes hydraulic fracturing, which is a well stimulation technique that typically involves pumping hydraulic fracturing fluid into a wellbore at a rate and pressure sufficient to form fractures in a rock formation surrounding the wellbore. This well stimulation technique often enhances the natural fracturing of a rock formation in order to increase the permeability of the rock formation, thereby improving recovery of water, oil, natural gas, and/or other fluids. In order to fracture such rock formations, the hydraulic fracturing fluid is injected into the wellbore at pressures and rates sufficient to exceed a fracture gradient of the target formation. In some conventional arrangements, a series of pumps is used to pressurize the hydraulic fracturing fluid. Conduit flows the hydraulic fracturing fluid from the pumps to a fracturing manifold. The fracturing manifold receives the pressurized hydraulic fracturing fluid from the pumps and delivers the hydraulic fracturing fluid to an injection point (e.g., a frac tree) at the necessary pump rate.

In these types of applications, the hydraulic fracturing fluid (in the form of a slurry), having hard proppant particles therein, is pressurized to high pressures, such as 15,000 pounds per square inch (psi). As slurry is forced through conduit, the conduit is subject to high levels of abrasion due to the highly pressurized slurry. Excessive wear of the conduit can lead to reduced lifetimes of the conduit. Increased frequency of maintenance and/or reduced lifetime of the conduit can result in reduced levels of uptime of processes reliant on the conduit.

An example high pressure fluid conduit union is described in U.S. Patent Pub. No. 2019/0137019 (hereinafter referred to as the '019 reference). In particular, the '019 reference describes a high-pressure swivel joint. The '019 reference describes applying a thermal spray coating to bearing races in the swivel joint. The coated bearing races provide a hardened surface for bearings of the swivel joint to rotate within. The '019 reference does not, however, describe applying a thermal coating to a surface of fluid conduit that is exposed to fluid flow. As a result, the system described in the '019 reference is not configured to, among other things, provide a hardened surface on a surface of the fluid conduit that is exposed to fluid flow.

Example embodiments of the present disclosure are directed toward overcoming the deficiencies described above.

SUMMARY

An example fluid system includes a first conduit section having a first conduit bore extending from a first end of the first conduit section to a second end of the first conduit section, the first conduit bore including a first beveled surface proximate the first end of the first conduit section and a first inner surface spaced from the first end of the first conduit section by the first beveled surface, the first beveled surface and the first inner surface at least partially defining a first fluid passageway. The fluid system also includes a second conduit section having a second conduit bore extending from a first end of the second conduit section to a second end of the second conduit section, the second conduit bore including a second beveled surface proximate the first end of the second conduit section and a second inner surface spaced from the first end of the second conduit section by the second beveled surface, the second beveled surface and the second inner surface at least partially defining a second fluid passageway, wherein the first end of the first conduit section is coupled to the first end of the second conduit section to fluidly connect the first fluid passageway and the second fluid passageway. The fluid system further includes a coating applied to the first beveled surface and to the second beveled surface.

An example hammer union includes a first conduit section having a first conduit bore extending from a first end of the first conduit section to a second end of the first conduit section, the first conduit bore including a first beveled surface proximate the first end of the first conduit section and a first inner surface spaced from the first end of the first conduit section by the beveled surface, the first beveled surface and the first inner surface at least partially defining a first fluid passageway. The hammer union also includes a second conduit section having a second conduit bore extending from a first end of the second conduit section to a second end of the second conduit section, the second conduit bore including a second beveled surface proximate the first end of the second conduit section and a second inner surface spaced from the first end of the second conduit section by the second beveled surface, the second beveled surface and the second inner surface at least partially defining a second fluid passageway. The hammer union further includes a seal interposed between the first conduit section and the second conduit section when the first conduit section is coupled to the second conduit section to fluidly connect the first fluid passageway and the second fluid passageway and a thermal coating applied to at least one of the first beveled surface and the second beveled surface.

In a further example, a fluid system includes a conduit section having a conduit bore extending from a first end of the conduit section to a second end of the conduit section, the conduit bore including a beveled surface proximate the first end of the conduit section and an inner surface spaced from the first end of the conduit section by the beveled surface, the beveled surface and the inner surface at least partially defining a fluid passageway. The fluid system further includes a coating applied to the beveled surface.

DETAILED DESCRIPTION

This disclosure generally relates to conduit-based fluid flow systems. Such systems generally include a plurality of separate elements, e.g., conduit sections, valves, diverters, and/or the like are joined together to form a continuous conduit through which fluid, e.g., compressed fluid, flows. In some instances, for ease of explanation, "conduit" or "conduit section" may be used herein to describe an individual element making up the overall system. Furthermore, the term "union" is used to describe a connection or coupling of two (or more) elements (or conduits or conduit sections). Various of the elements can include features that facilitate the union. For instance, and without limitation, separate conduit sections can include flanges, threaded portions, male or female features, seal seats, or the like. Furthermore, for ease of explanation, the fluid conduit will be referred to herein as "conduit". Wherever possible, the same reference numbers will be used throughout the drawings to refer to the same or like parts.

Figure 1:
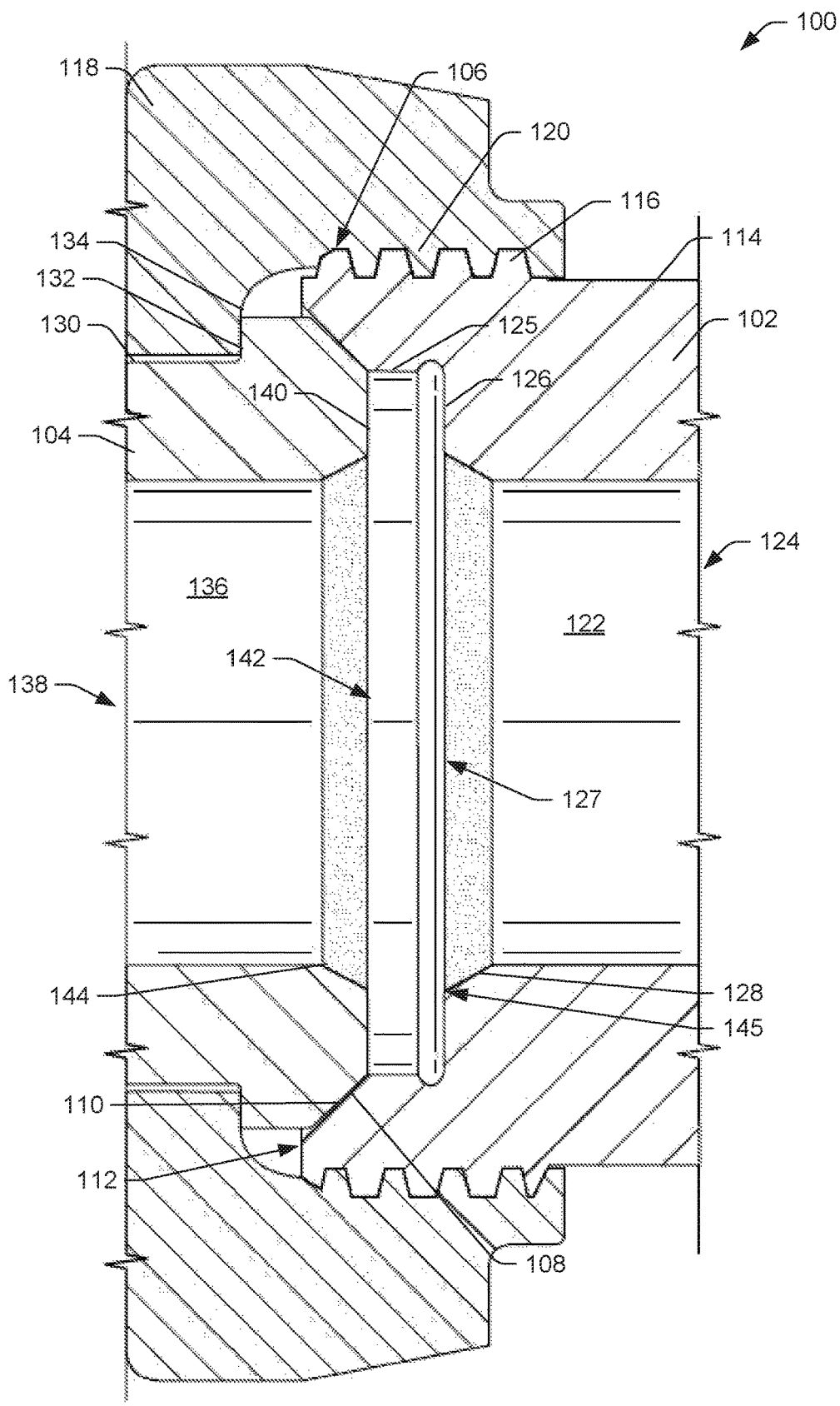
FIG. 1 is a cross-sectional view of an example fluid conduit union in accordance with an example of the present disclosure.

FIG. 1 depicts a cross-sectional view of an example fluid conduit union 100 (referred to herein as "the union 100"). In some examples, the union 100 may represent a hammer union. However, the union 100 is for illustration only and could alternatively or additionally include any type of union that joins two or more sections of conduit together. Without limitation, the union 100 may be representative of a section of conduit being joined to a valve, two valves being joined together, or any other type of fluid conduit junction. As shown in FIG. 1, the union 100 includes a first conduit section 102 and a second conduit section 104. In some examples, the first conduit section 102 may be a section of pipe, an inlet or outlet of a valve, or other type of fluid conduit. The first conduit section 102 and the second conduit section 104 may be tubular members, such that the first conduit section 102 and the second conduit 104 section may together form a fluid passageway extending through the union 100. The union 100, and components thereof, may be comprised of various types of steel and/or other metal materials.

The first conduit section 102 includes an end 106 that is configured as a female end such that at least a portion of an end 112 of the second conduit section 104 is inserted therein. In some examples, the first conduit section 102 may include a first end (e.g., end 106) configured as a female end and a second end (not shown) configured as a male end. The end 106 of the first conduit section 102 includes a beveled surface 108. In some examples, the beveled surface 108 of the end 106 of the first conduit section 102 is configured to abut a beveled surface 110 of the end 112 of the second conduit section 104 when the first conduit section 102 and the second conduit section 104 are joined to form the union 100. While describing various "surfaces" herein, it is to be understood that the various "surfaces" described herein are annular in nature. As shown in FIG. 1, at least a portion of the end 106 of the first conduit section 102 may surround at least a portion of the end 112 of the second conduit section 104. For example, the end 106 of the first conduit section 102 may be configured to at least partially overlap (e.g., axially) the end 112 of the second conduit section 104.

The first conduit section 102 further includes an exterior surface 114. The exterior surface 114 of the first conduit section 102 includes a threaded portion 116 located proximate the end 106 of the first conduit section 102. The union 100 may also include a nut 118 having threading 120 that corresponds with the threaded portion of the first conduit section 102. For example, the threading of the nut 118 includes an interior diameter that corresponds with an exterior diameter of the threaded portion 116 of the first conduit section 102. These and other features of the nut 118 will be described further herein. The first conduit section 102 also includes an interior surface 122 defined in part by a first conduit bore 124. The first conduit bore 124 extends along a length of the first conduit section 102 and provides a fluid passageway through which fluid may flow. As shown in FIG. 1, the first conduit section 102 may also include a first surface 126 circumscribing an opening 127 of the first conduit bore 124. In some examples, the first surface 126 is substantially flat and is configured to accommodate a seal between the first surface 126 and the second conduit section 104, as is shown and described further herein. The first conduit section 102 may also include a cylindrical surface 125 that, together with the first surface 126, forms a seal seat on which a seal may rest or be inserted therein.

Furthermore, the first conduit section 102 includes another beveled surface 128 (or "interior beveled surface 128") on an interior portion of the first conduit section 102. For example, the interior beveled surface 128 extends from the interior surface 122 of the first conduit section 102 towards the exterior surface 114 of the first conduit section 102. In other words, the interior beveled surface 128 extends between the first surface 126 and the interior surface 122, with a diameter being smaller proximate the interior surface 122 and greater proximate the first surface 126. As such, the interior beveled surface 128 includes a non-perpendicular angle with respect to the interior surface 122. Accordingly, the first conduit bore 124 has a relatively larger interior diameter proximate the end 106 and tapers, via the interior beveled surface 128 to a smaller diameter at the interior surface 122. In some examples, the first conduit section 102 may omit the interior beveled surface 128 or include multiple bevels (or steps) at the location of the interior beveled surface 128. Still further, while the interior surface 122 is shown as defining a substantially constant diameter, the interior surface 122 may also be tapered.

Similarly, the second conduit section 104 includes the end 112 that is configured as a male end such that at least a portion of the second conduit section 104 is inserted into the first conduit section 102. In some examples, the end 112 of the second conduit section 104 may be a first end configured as a male end and an opposite, e.g., second end (not shown), may be configured as a female end. As mentioned previously, the second conduit section 104 includes the beveled surface 110 located on the end 112 of the second conduit section 104. The beveled surface 110 extends between a face (140) of the end 112 of the second conduit section 104 and an exterior surface 130 of a flange 132. As such, the beveled surface 110 is configured to abut the beveled surface 108 proximate the end 106 of the first conduit section 102.

As mentioned previously, the second conduit section 104 also includes a flange 132 located on the exterior surface 130 of the second conduit section 104 and proximate the end 112 of the second conduit section. The flange 132 of the second conduit section 104 is configured to correspond with and abut a surface 134 of the nut 118. Thus, when the threading 120 on the nut 118 engages with the threaded portion 116 of the first conduit section 102 and the surface 134 of the nut 118 abuts the flange 132 of the second conduit portion 104, when the nut 118 is rotated in a first direction, the nut 118 draws the first conduit section 102 and the second conduit section 104 towards each other, such that the beveled surface 108 of the first conduit section 102 seats against the beveled surface 110 of the second conduit section 104. Conversely, when the nut 118 is rotated in a second direction (opposite the first direction), the nut 118 allows the first conduit section 102 and the second conduit section 104 to be separated.

The second conduit section 104 includes an interior surface 136 partially defining a second conduit bore 138. The second conduit bore 138 extends along a length of the second conduit section 104 and provides a fluid passageway through which fluid may flow. As shown in FIG. 1, the second conduit section 104 may also include a second surface 140 circumscribing an opening 142 of the second conduit bore 138. In some examples, the second surface 140 is shaped and configured to abut a seal disposed between the first surface 126 and the second surface 140, thereby forming a seal when the nut 118 is tightened on the union 100.

The second conduit section 104 also includes another beveled surface 144 (or "interior beveled surface") on an interior portion of the second conduit section 104. The interior beveled surface 144 extends from the interior surface 136 from the interior surface 136 of the second conduit section 104 towards the exterior surface 130 of the second conduit section 104. In other words, the interior beveled surface 144 extends between the second surface 140 and the interior surface 136. As such, the interior beveled surface 144 includes a non-perpendicular angle with respect to the interior surface 136. Accordingly, the second conduit bore 138 has a relatively larger interior diameter proximate the end 112 and tapers, via the interior beveled surface 144 to a smaller diameter at the interior surface 136. In some examples, the second conduit section 104 may omit the interior beveled surface 144 or include multiple bevels (or steps) at the location of the interior beveled surface 144. Still further, while the interior surface 136 is shown as defining a substantially constant diameter, the interior surface 136 may also be tapered. In some examples, the interior beveled surface 144 is non-perpendicular to a direction of extension of the interior surface 136.

As shown in FIG. 1, the interior beveled surface 128 of the first conduit section 102 and the interior beveled surface 144 of the second conduit section 104 are arranged to form a recess 145 having a relatively larger diameter than the diameters of interior surface 122 and interior surface 136. The recess 145 may reduce turbulent flow that may be created by the seal if the seal were proud to the interior surfaces 122 and 136 of the first conduit section 102 and the second conduit section 104. Furthermore, recessing the seal from the interior surfaces 122, 136 may create flow disturbance (such as a dead zone) around the seal and may reduce the amount of abrasion that the seal experiences. However, if the interior beveled surfaces 128 and 144 create a recess 145 that is overly deep, the conduit (102 and 104) may experience greater abrasive forces.

As also illustrated in FIG. 1, a coating 146 is applied to the interior beveled surface 128 of the first conduit section 102 and/or the interior beveled surface 144 of the second conduit section 104. In some examples, the coating 146 is also applied to the first surface 126 of the first conduit section 102 and/or the second surface 140 of the second conduit section 104 in addition to, or instead of, the interior beveled surface 128 of the first conduit section 102 and the interior beveled surface 144 of the second conduit section 104. The coating 146 may include a hardness that is greater than the hardness of the material used for the conduit sections 102, 104 and may, therefore, resist abrasive forces and/or resist corrosion which may result in a longer usable life, when compared to a non-coated conduit. In some examples, other surfaces of the conduit sections 102, 104, for example and without limitation, interior surface 122 and interior surface 136 may be substantially free of the coating. As used herein, a surface that is "substantially free" of coating may be a surface to which a coating is not directly or intentionally directly applied, but may still be subjected to some hardening. For example, in a spray-coating hardening process, some overspray may occur on surfaces adjacent to or otherwise proximate surfaces intended to be hardened. However, in some examples, interior surface 122 and interior surface 136 may be coated in addition to, or instead of, the surfaces described previously.

In some examples, the coating 146 includes a metallic alloy formed from a powdered metal alloy. The powdered metal alloy may include at least one of tungsten carbide, cobalt, or chromium and may include any combination (percentage) of such materials. In some examples, the coating 146 is a thermal spray coating that is applied using a high velocity air fuel (HVAF) thermal spray process. However, in some examples, the coating 146 may be applied as a thermal spray via other processes including a high velocity oxygen fuel (HVOF) thermal spray process. Furthermore, the coating 146 may instead be applied via a plating, diffusion, or physical vapor deposition (PVD) process, among other processes. Other techniques, including but not limited to plasma twin wire arc, may also be used to apply the coating 146 to the identified surfaces. The process may vary based on the type of material used as the first conduit section 102 and the second conduit section 104 and/or the type of material used for the coating 146. Any technique that allows for a robust mechanical bond of the coating 146 to the desired surfaces may be used. By including coating 146 on the interior beveled surfaces 128 and 144, the union 100 configuration may reduce wear on the seal by creating flow disturbance around the seal, while increasing the resistance of the interior beveled surfaces 128 and 144 to erosive forces caused by pumping a highly abrasive slurry through the union 100.

In examples, the coating 146 may include any suitable thickness. By way of example, and not limitation, the coating 146 may include a thickness between approximately 0.00001 inches and approximately 0.10 inches. In some examples, the coating 146 may have a thickness between approximately 0.0001 inches and approximately 0.01 inches. Additionally, and/or alternatively, the coating 146 may have a thickness between approximately 0.001 inches and approximately 0.009 inches. Furthermore, the coating 146 may be substantially uniform in thickness. Moreover, the coating 146 may have a suitable surface finish. For instance, the coating 146 on the interior beveled surfaces 128 and 144 may need a particularly smooth finish, e.g., to ensure that the coating 146 does not include cracks, rough patches, or other inconsistencies that may be particularly disposed to erosion. In examples, a thermal spray technique such as high velocity air fuel may result in a sufficient surface finish, e.g., without subsequent finishing, polishing, or the like. Furthermore, the coating 146 may be applied to additional or fewer surfaces of the union 100 than described herein.

In some examples, the coating 146 is applied to the interior beveled surfaces 128, 144 and/or the first surface 126 and the second surface 140 as such surfaces may experience the greatest abrasive forces. Furthermore, as the seal may be recessed from edges (204, 302) of the interior surfaces 122, 136 in order to extend a usable life of the seal as the interior beveled surfaces 128, 144 and/or the first surface 126 and the second surface 140 may experience greater abrasive forces.

Figure 2:
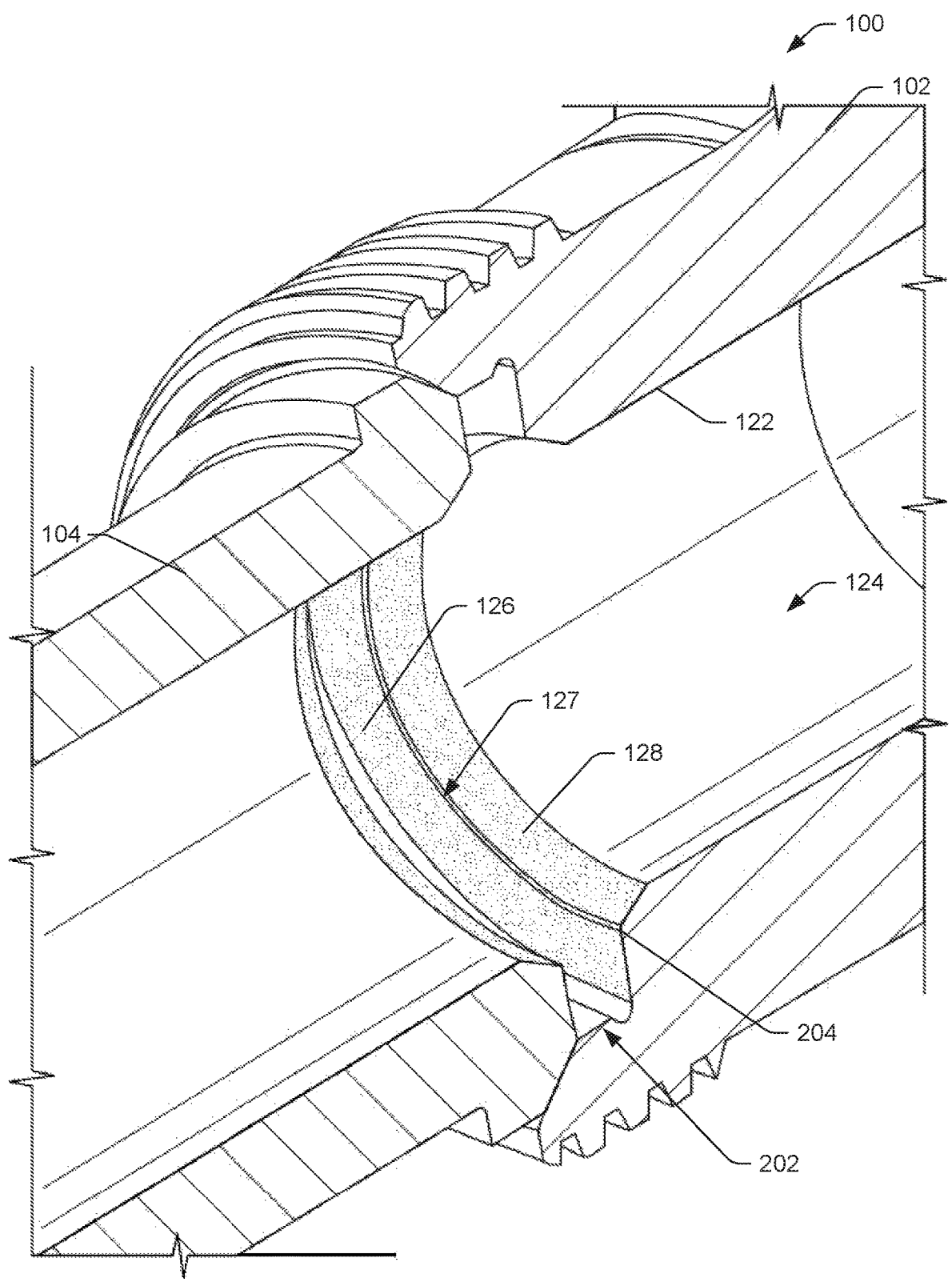
FIG. 2 is a first perspective cross-sectional view of the fluid conduit union illustrated in FIG. 1, in accordance with an example of the present disclosure.

FIG. 2 depicts a first perspective cross-sectional view of the union 100 shown and described with respect to FIG. 1. The first perspective view better illustrates aspects of the first conduit section 102. For instance, the view shows the first surface 126 of the first conduit section 102 circumscribing the opening 127 of the first conduit bore 124. In some examples, the first surface 126 is shaped and configured to accommodate a seal between the first surface 126 and the second conduit section 104. For example, when inserted into a space 202 between the first conduit section 102 and the second conduit section 104, a surface of the seal abuts the first surface 126 and is held securely between the first conduit section 102 and the second conduit section 104. Furthermore, in some examples, the first conduit section 102 may include an edge 204 between the interior beveled surface 128 and the first surface 126. In some examples, the edge 204 includes a radius, chamfer, or other edge break rather than having a straight edge. By including an edge 204 with a radius, chamfer, or other edge break, the coating 146 may be applied to the first conduit section 102 with a more uniform thickness than when applied to a straight edge.

Figure 3:
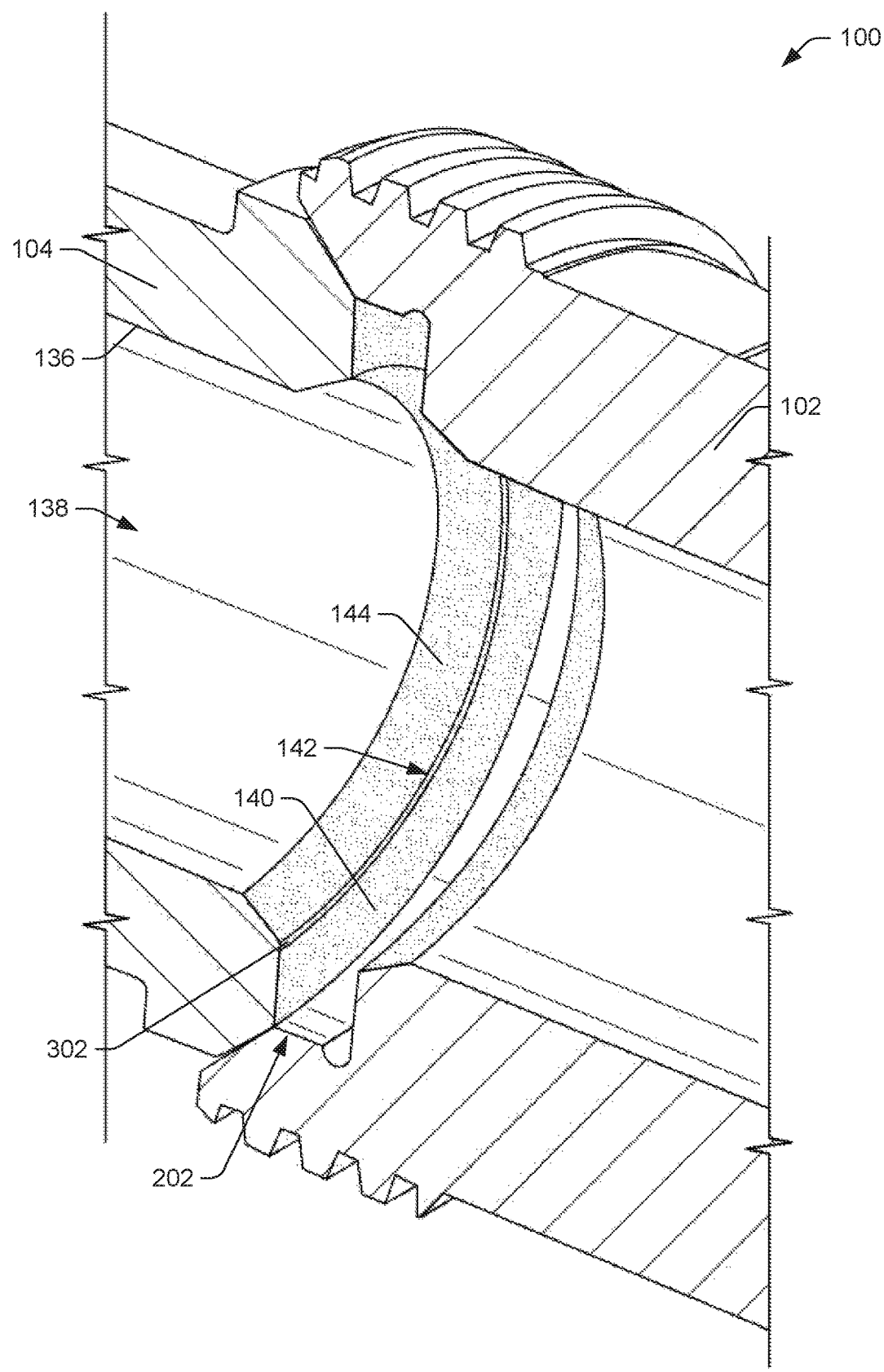
FIG. 3 is second perspective cross-sectional view of the fluid conduit union illustrated in FIG. 1, in accordance with an example of the present disclosure.

FIG. 3 depicts a second perspective cross-sectional view of the union 100 shown and described with respect to FIG. 1. The second perspective view better illustrates aspects of the second conduit section 104. For instance, the view shows the second surface 140 circumscribing the opening 142 of the second conduit bore 138. In some examples, the second surface 140 is shaped and configured to accommodate a seal between the first surface 126 and the second conduit section 104. For example, when inserted between the space 202 between the first conduit section 102 and the second conduit section 104, a surface of the seal abuts the second surface 140 and is held securely between the first conduit section 102 and the second conduit section 104. Furthermore, in some examples, the first conduit section 102 may include an edge 302 between the interior beveled surface 144 and the second surface 140. Similar to edge 204, the edge 302 includes a radius, chamfer, or other edge break rather than having a straight edge. By including an edge 302, the coating 146 may be applied to the second conduit section 104 with a more uniform thickness than when applied to a straight edge.

Figure 4:
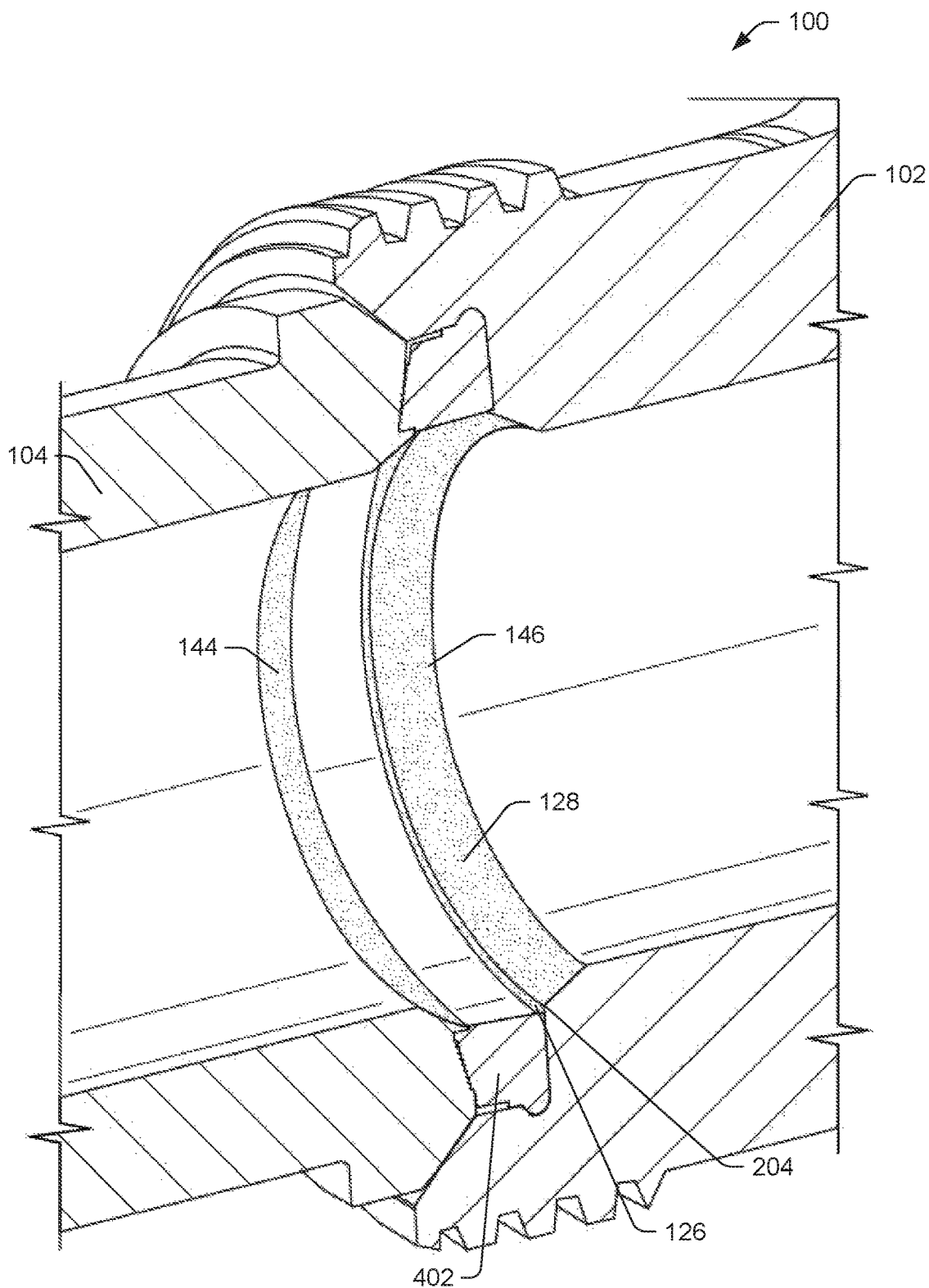
FIG. 4 is a first perspective cross-sectional view of an example fluid conduit union including a seal, in accordance with an example of the present disclosure.

FIG. 4 depicts the first perspective cross-sectional view of the union 100 of FIG. 2, with a seal 402 inserted into the space 202 shown and described with respect to FIGS. 2-3. In some examples, the seal 402 includes at least one of the following materials: fluorocarbon, urethane, nitrile butadiene rubber, hydrogenated nitrile butadiene rubber, or other suitable material. As shown in FIG. 4, the seal 402 is at least partially recessed from the edge 204 of the interior beveled surface 128 of the first conduit section 102 such that the first surface 126 is partially seen. However, in some examples, the seal 402 may be flush with the edge 204 of the interior beveled surface 128 such that the first surface 126 is not exposed to fluid flow. In either example, coating the first surface 126 with the coating 146 may serve to harden the first surface 126 thereby increasing the ability of the first surface 126 to resist abrasive forces to which the first surface 126 may be exposed via fluid flow. Furthermore, if the flow of fluid is directional, only portions of the downstream conduit section (i.e., either the first conduit section 102 or the second conduit section 104) may include the coating 146 thereon. However, the coating 146 may be applied to portions of both conduit sections 102, 104 in directional or bi-directional flow scenarios.

Figure 5:
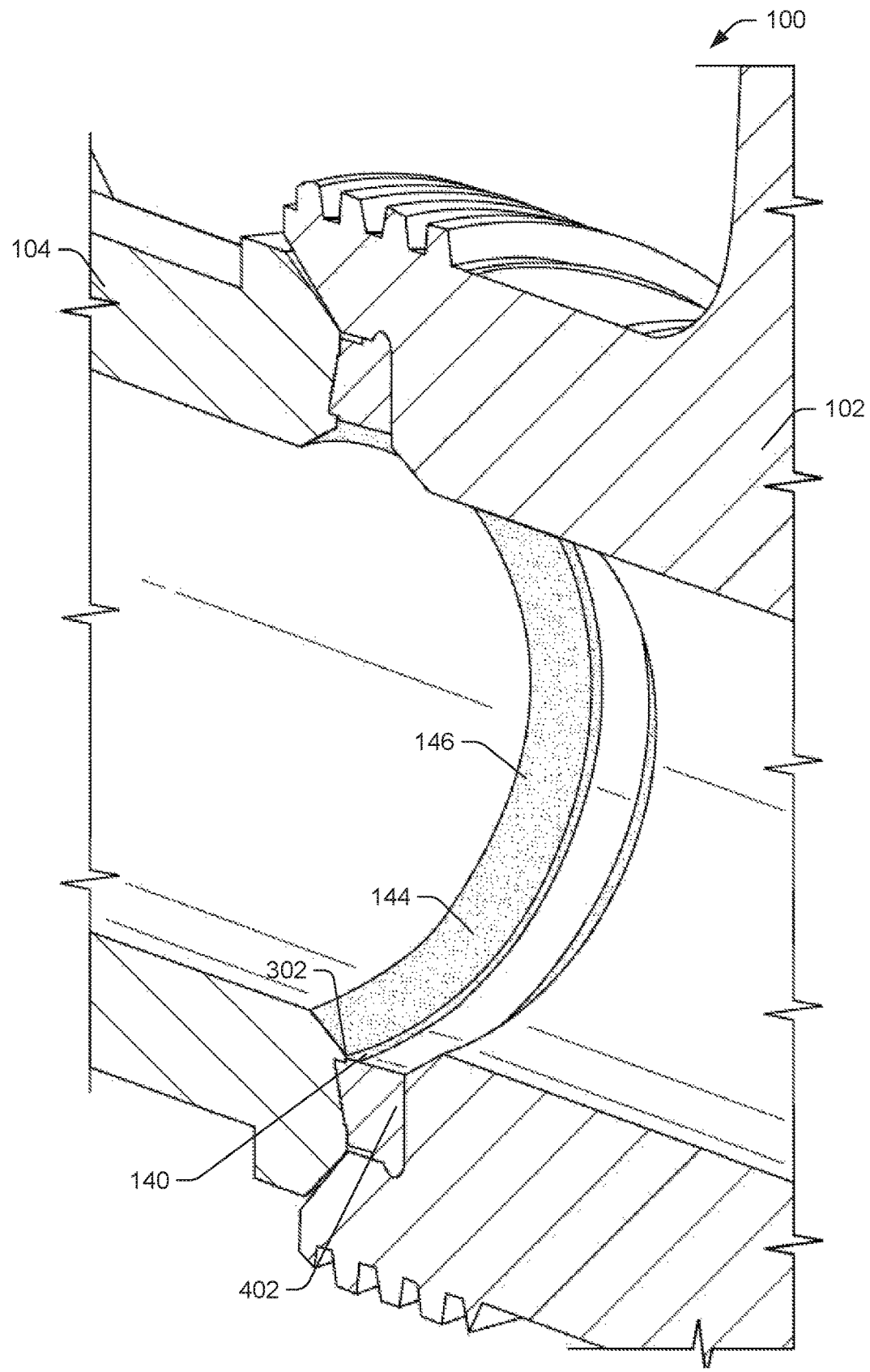
FIG. 5 is a second perspective cross-sectional view of the example fluid conduit union illustrated in FIG. 4, in accordance with an example of the present disclosure.

FIG. 5 depicts a second perspective cross-sectional view of the union 100 of FIG. 2, with the seal 402 inserted into the space 202. As shown in FIG. 5, the seal 402 is at least partially recessed from the edge 302 of the interior beveled surface 144 of the second conduit section 104 such that the second surface 140 is partially seen. However, in some examples, the seal 402 may be flush with the edge 302 of the interior beveled surface 144 such that the second surface 140 is not exposed to fluid flow. In either example, coating the second surface 140 with the coating 146 may serve to harden the second surface 140 thereby increasing the ability of the second surface 140 to resist abrasive forces if/when the second surface 140 is exposed to fluid flow. Furthermore, if the flow of fluid is directional, only portions of the downstream conduit section (i.e., either the first conduit section 102 or the second conduit section 104) may include the coating 146 thereon. However, the coating 146 may be applied to portions of both conduit sections 102, 104 in directional or bi-directional flow scenarios.

Figure 6:
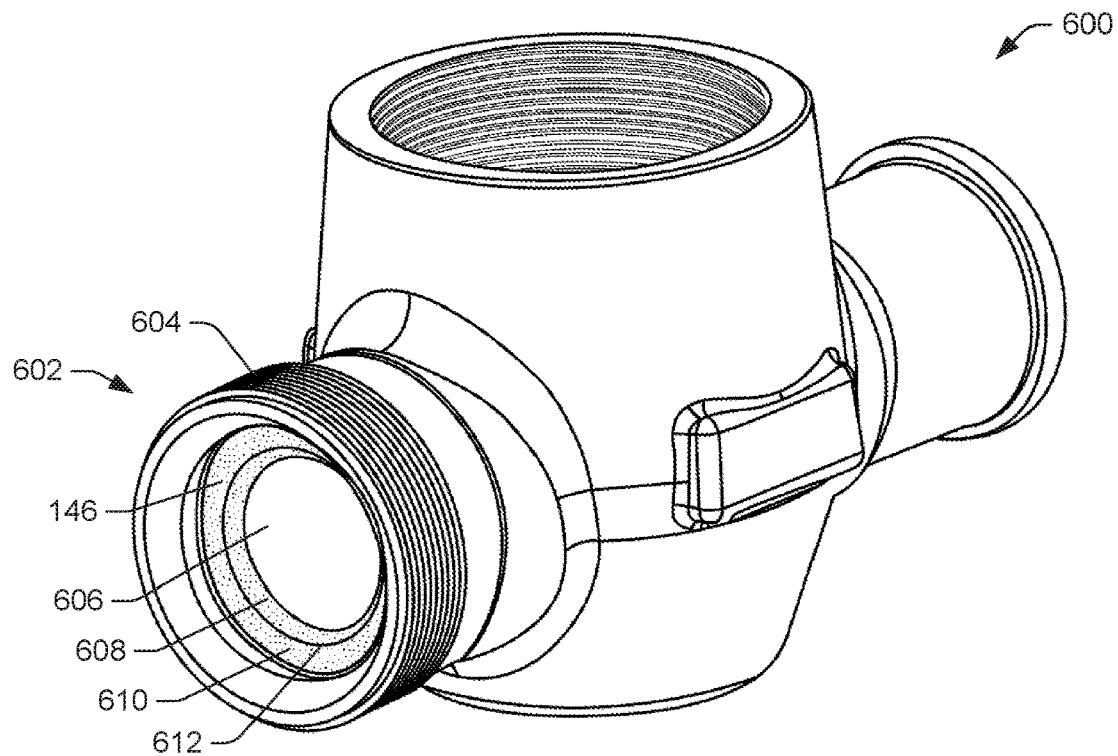
FIG. 6 is an example swing check valve showing a female union portion thereof, in accordance with an example of the present disclosure.

FIG. 6 depicts an example swing check valve 600 having a female union end 602. The female union end 602 may include same or similar features as the first conduit section 102 described previously. For example, the female union end 602 includes threading 604 that is configured to correspond with threading associated with a nut that secures the female union end 602 to a secondary conduit. Furthermore, the female union end 602 may cooperate with a male union end of a conduit section, e.g., the second conduit section 104 discussed above, (or another valve) such that the male union end is at least partially inserted into the female union end 602. Furthermore, the swing check valve 600 includes a valve bore 606 extending along a length of the swing check valve 600, thereby forming a fluid passageway. The swing check valve 600 also includes an interior beveled surface 608 proximate an end of the female union end 602. The interior beveled surface 608 extends from an interior surface defined by the valve bore towards an exterior surface of the female union end 602. The swing check valve 600 also includes a surface 610 circumscribing an opening of the valve bore 606. In some examples, the interior beveled surface 608 and/or the surface 610 may be coated with the coating 146, whereas other surfaces may be substantially free of the coating 146. Furthermore, the swing check valve 600 may include an edge 612 located between the interior beveled surface 608 and the surface 610. The edge 612 may include a radius, chamfer, or other edge break and may also be coated with the coating 146.

In some examples, the female union end 602 may be joined to a male union end similar to the first conduit section 102 and the second conduit 104 that form the union 100. Accordingly, a seal may be inserted between the female union end 602 and the male union end and a nut may secure the female union end 602 to the male union end.

Figure 7:
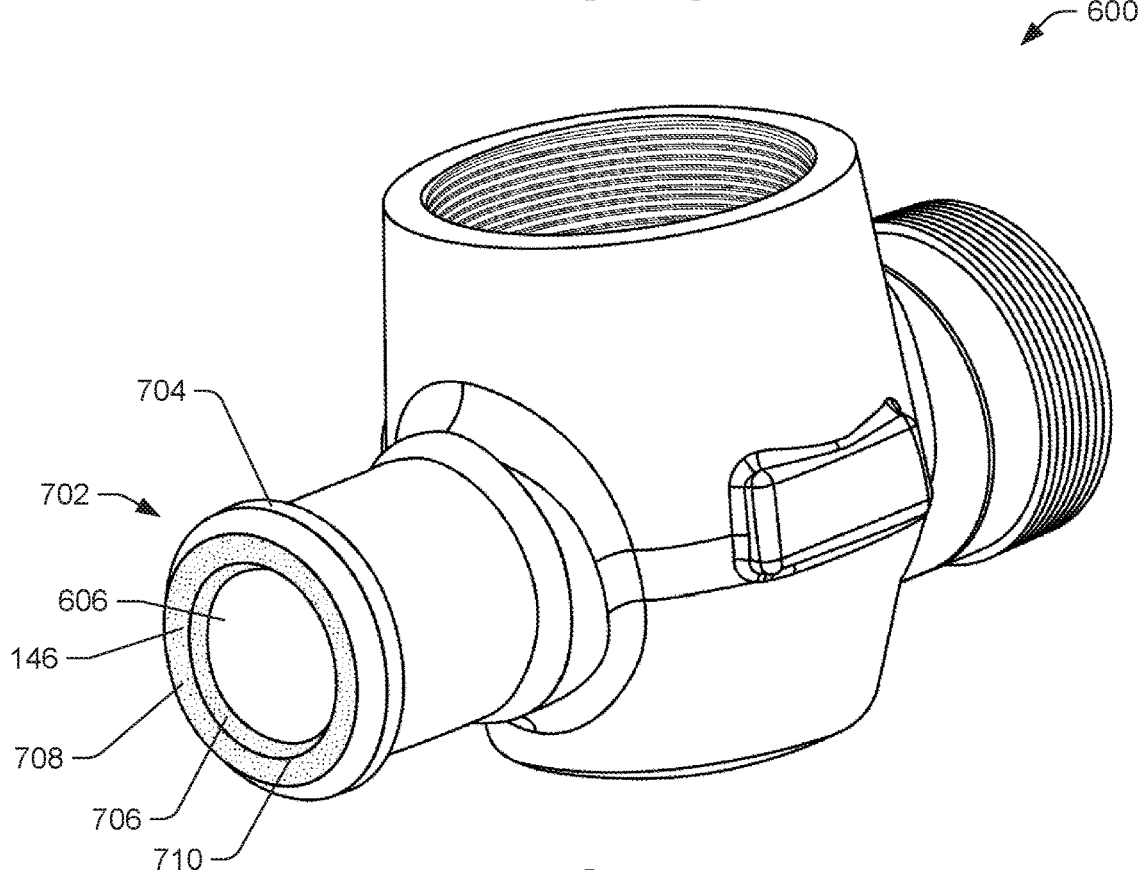
FIG. 7 is an example swing check valve showing a male union portion thereof, in accordance with an example of the present disclosure.

FIG. 7 depicts a male union end 702 of the swing check valve 600. The male union end 702 may include same or similar features as the second conduit section 104 described previously. For example, the male union end 702 includes a flange 704 that is configured to correspond with a surface of the nut that secures the male union end 702 to a secondary conduit. Furthermore, the male union end 702 may cooperate with a female union end of a conduit section, e.g., the first conduit section 102 discussed above, (or another valve) such that the male union end 702 is at least partially inserted into the female union end. Furthermore, the swing check valve 600 includes a valve bore 606 extending along a length of the swing check valve 600, thereby forming a fluid passageway. The swing check valve 600 also includes an interior beveled surface 706 proximate an end of the male union end 702. The interior beveled surface 706 extends from an interior surface defined by the valve bore towards an exterior surface of the male union end 702. The swing check valve 600 also includes a surface 708 circumscribing an opening of the valve bore 606. In some examples, the interior beveled surface 706 and/or the surface 708 may be coated with the coating 146, whereas other surfaces may be substantially free of the coating 146. Furthermore, the swing check valve 600 may include an edge 710 located between the interior beveled surface 706 and the surface 710. The edge 710 may include a radius, chamfer, or other edge break and may also be coated with the coating 146.

In some examples, the male union end 702 may be joined to a female union end similar to the first conduit section 102 and the second conduit 104 that form the union 100. Accordingly, a seal may be inserted between the male union end 702 and the female union end and a nut may secure the male union end 702 to the female union end.

Figure 8:
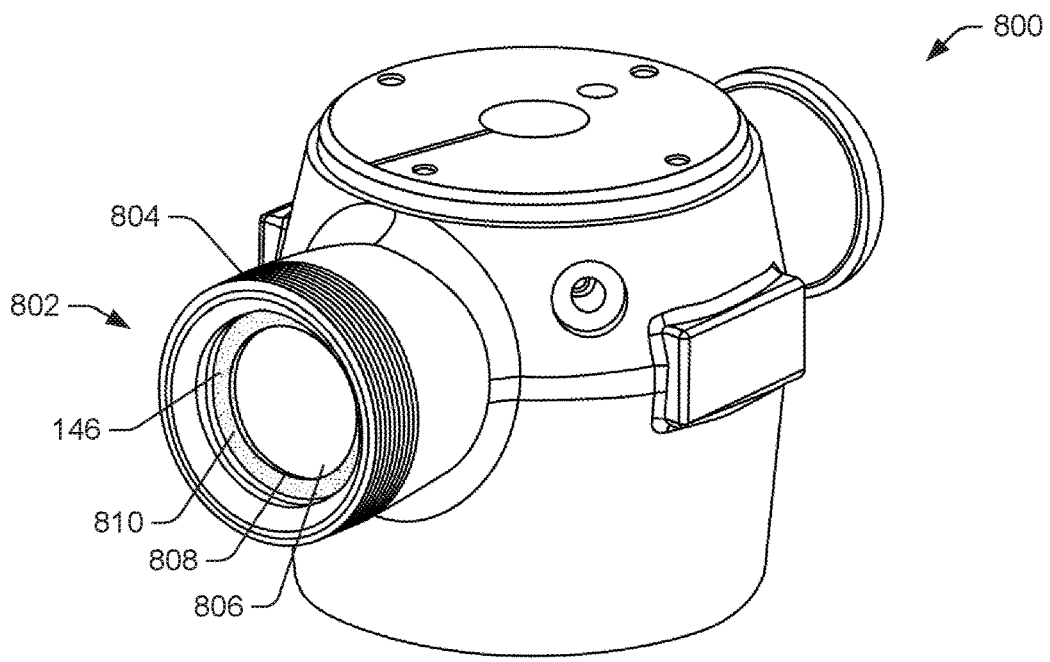
FIG. 8 is an example plug valve showing a female union portion thereof, in accordance with an example of the present disclosure.

FIG. 8 depicts an example plug valve 800 having a female union end 802. The female union end 802 may include same or similar features as the first conduit section 102 described previously. For example, the female union end 802 includes threading 804 that is configured to correspond threading associated with a nut that secures the female union end 802 to a secondary conduit. Furthermore, the female union end 802 may correspond with a male union end of conduit (or another valve) such that the male union end is at least partially inserted into the female union end 802. Furthermore, the plug valve 800 includes a valve bore 806 extending along a length of the plug valve 800, thereby forming a fluid passageway. In some examples, the plug valve 800 may omit the interior beveled surface due to a greater diameter of the valve bore 806. In some examples (particularly with conduit of larger relative diameter), the plug valve 800 may include a radius 808 between the valve bore 806 and a surface 810 that circumscribes an opening of the valve bore 806. In some examples, the radius 808 and the surface 810 may be coated with the coating 146.

Figure 9:
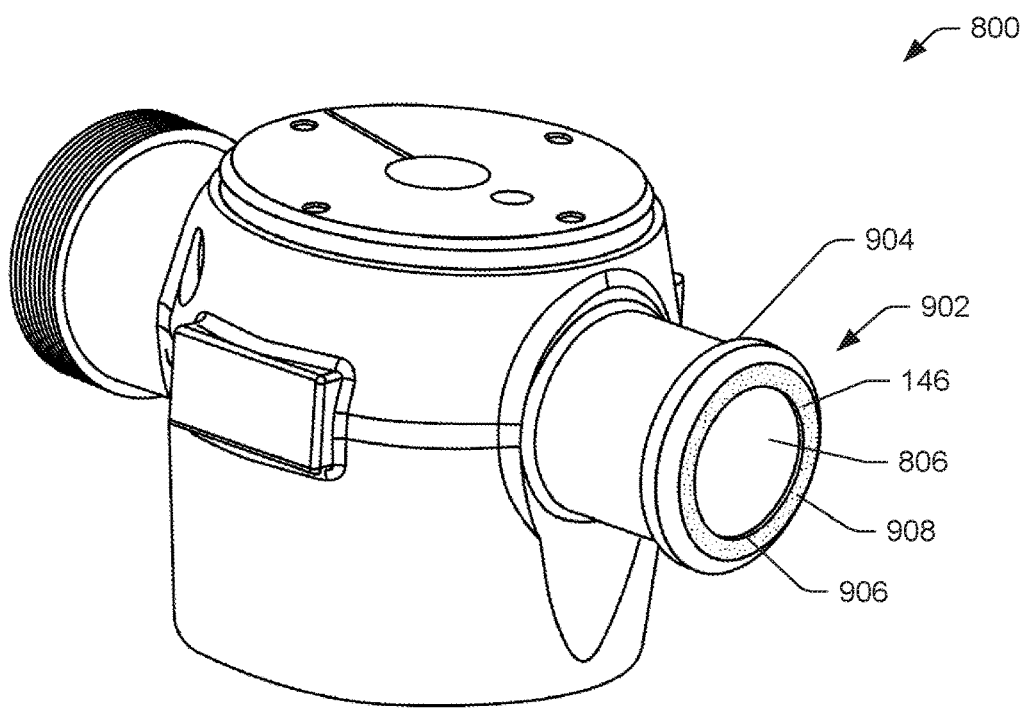
FIG. 9 is an example plug valve showing a male union portion thereof, in accordance with an example of the present disclosure.

FIG. 9 depicts a male union end 902 of the example plug valve 800. The male union end 902 may include same or similar features as the second conduit section 104 described previously. For example, the male union end 902 includes a flange 904 that is configured to correspond with a surface of the nut that secures the male union end 902 to a secondary conduit. Furthermore, the male union end 902 may correspond with a female union end of conduit (or another valve) such that the male union end 902 end is at least partially inserted into the female union end. Furthermore, the plug valve 800 includes a valve bore 806 extending along a length of the plug valve 800, thereby forming a fluid passageway. As described previously, the plug valve 800 may omit the interior beveled surface due to a greater diameter of the valve bore 806. In some examples, the plug valve 800 may include a radius 906 between the valve bore 806 and a surface 908 that circumscribes an opening of the valve bore 806 proximate an end of the male union end 902. In some examples, the radius 906 and the surface 908 may be coated with the coating 146, whereas other surfaces may be substantially free of the coating.

Figure 10:
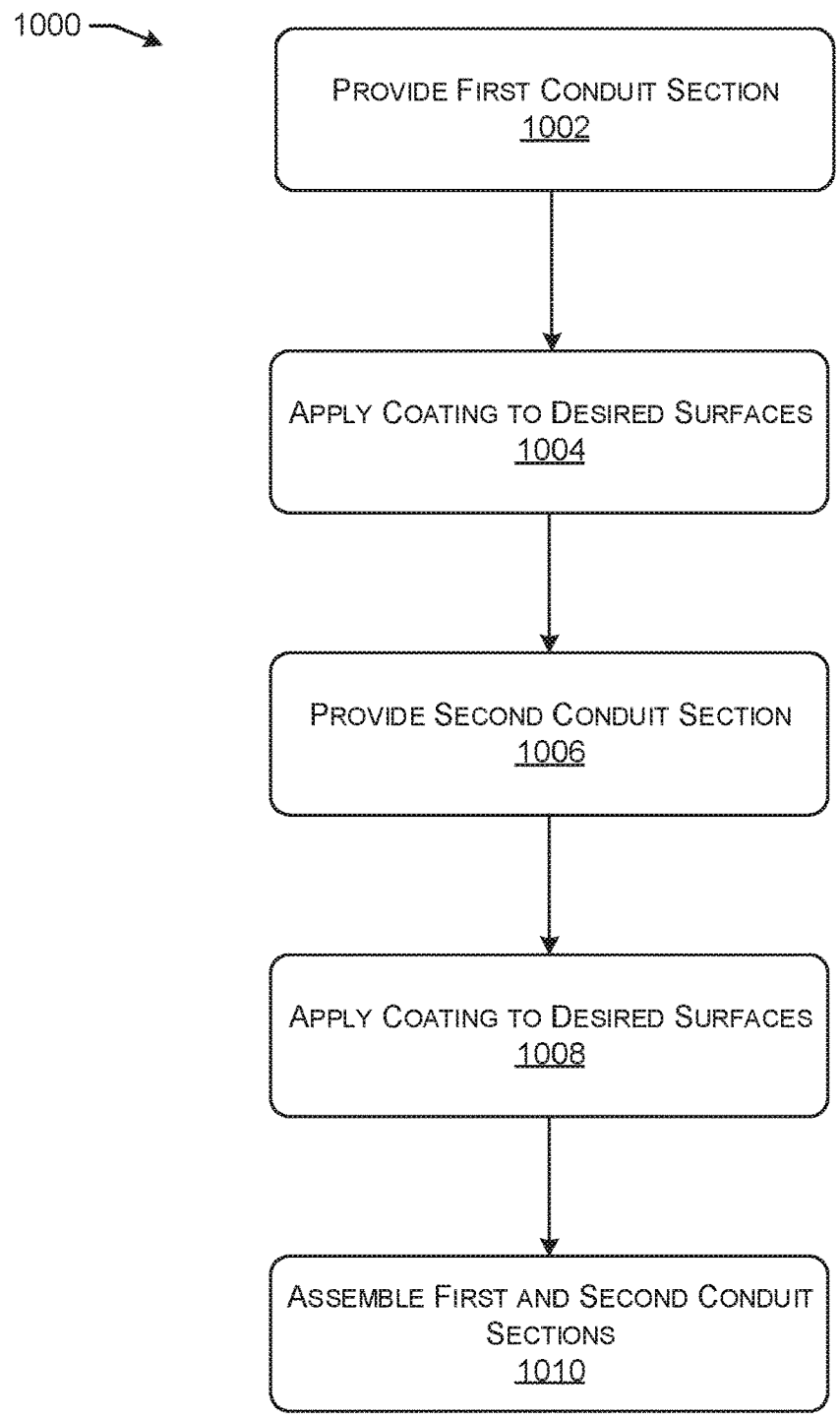
FIG. 10 is a flowchart illustrating a method of manufacturing a flow conduit union, in accordance with an example embodiment of the present disclosure.

FIG. 10 illustrates an example method 1000 of coating portions of the union 100. As discussed further herein, the union 100 may be better suited to resist corrosion, erosion, and/or abrasion than conventional fluid conduit unions and may be cost effective to produce. The method 1000 shows some example steps for achieving such benefits. It is to be understood, that certain steps of the method 1000 described herein may be conducted contemporaneously or sequentially. The order in which the operations are described is not intended to be construed as a limitation, and any number of the described steps may be combined in any order and/or in parallel to implement the process.

Specifically, at operation 1002, the method 1000 includes providing a first conduit section. In examples described herein, the first conduit section may be the first conduit section 102, the second conduit section 104, and/or some other conduit and/or valve section. The first conduit section may also define a bore that includes a conduit bore section having an interior beveled surface proximate an end of the first conduit section and a surface circumscribing an opening of the bore.

At 1004, the method 1000 includes applying the coating to the desired surfaces. For example, the coating may be applied to the interior beveled surface and/or the surface circumscribing the opening of the bore. In the example of FIGS. 1 and 2, the operation 1004 may include applying the coating 146 to the first surface 126, the edge 204, and/or the interior beveled surface 128. In some instances, the coating 146 may be a metal alloy powder applied using a thermal spray technique, such as HVAF, HVOF, or other thermal spray technique. Alternatively, the coating 146 may instead be applied to the above described surfaces via plating, diffusion, PVD, or other processes. In some examples, the coating 146 can include a metal alloy powder including tungsten carbide. Furthermore, in some examples, the coating 146 may include a ceramic coating. In some examples, the first conduit section and a second conduit section may be coated contemporaneously.

At 1006, the method 1000 includes providing a second conduit section. For example, the second conduit section may be a conduit section configured to be at least partially inserted into the first conduit section provided at operation 1002. In the example of FIGS. 1 and 2, the first conduit section may be the first conduit section 102 and the second conduit section may be the second conduit section 104. In that example, the second conduit section 104 includes the male union end. As will be appreciated, in other examples, the first conduit section provided at the operation 1002 may be the second conduit section 104, and the second pipe section provided at the operation 1006 may be either the first conduit section 102. Of course, these are for examples only. However, in the context of FIG. 10, the first conduit section and the second conduit section should include corresponding union ends, as described herein.

At 1008, the method 1000 includes applying the coating to the desired surfaces of the second conduit section. For example, the coating may be applied to the interior beveled surface and/or the surface circumscribing the opening of the bore. In the example of FIGS. 1 and 2, the operation 1004 may include applying the coating 146 to the second surface 140, the edge 302, and/or the interior beveled surface 144. In some instances, the coating 146 may be a metal alloy powder applied using a thermal spray technique, such as HVAF, HVOF, or other thermal spray technique. Alternatively, the coating 146 may instead be applied to the above described surfaces via plating, diffusion, PVD, or other processes. In some examples, the coating 146 can include a metal alloy powder including tungsten carbide. Furthermore, in some examples, the coating 146 may include a ceramic coating. In some examples, the first conduit section and the second conduit section may be coated contemporaneously.

At 1010, the method 1000 includes assembling the first and second conduit sections. For example, and with reference to FIG. 1, the first and second conduit sections 102, 104 may be assembled by inserting the seal 402 into contact with the first surface 126 of the first conduit section 102, and inserting at least a portion of the end 112 of the second conduit section 104 into the first conduit section 102 such that the beveled surface 108 of the first conduit section 102 abuts the beveled surface 110 of the second conduit section 104, thereby forming a seal. The nut 118 may then be rotated to tighten the connection between the first conduit section 102 and the second conduit section 104.

The method 1000 allows for cost-effective and efficient manufacture of a fluid conduit union, as detailed herein. For instance, because selected surfaces are coated, the union 100 may be more resistant to corrosion, erosion, and/or abrasion. While the method may include an additional step, e.g., the coating step, compared to conventional fabrication, the coating can meaningfully increase life expectancy of the union 100 and/or the components thereof.

INDUSTRIAL APPLICABILITY

The present disclosure provides an improved fluid conduit union ("union") and methods of making the union. The union may be used in a variety of applications. For example, the union may be used in gas, oil, and fracking applications. The union may be particularly useful in high pressure applications and/or with fluids containing abrasive particles. The disclosed union may be in use for extended periods of time before failing and/or requiring replacement, which can result in a decrease in down time for fluid systems and/or reduce maintenance time and expense.

According to some embodiments, a union 100 may include a coating 146 on one or more surfaces that are at least partially exposed to fluid flow. By selectively applying the coating to one or more of these surfaces, the useful life of the union may be significantly increased. Moreover, by purposefully excluding the coating from other surfaces, deleterious effects can be avoided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fluid system comprising:
   a first conduit section including:
      a first beveled surface at a first end of the first conduit section;
      a cylindrical surface;
      a first conduit bore extending from the first end of the first conduit section to a second end of the first conduit section,
         the first conduit bore including:
            a first interior beveled surface proximate the first end of the first conduit section, and
            a first inner surface spaced from the first end of the first conduit section by the first interior beveled surface, and
         the first interior beveled surface and the first inner surface at least partially defining a first fluid passageway,
      a first surface circumscribing the first conduit bore,
         the cylindrical surface being between the first surface and the first beveled surface,
         the cylindrical surface and the first surface forming a seal seat, and
         the first interior beveled surface extending from the first surface to the first inner surface; and
      a first edge located between the first surface and the first interior beveled surface;
   a second conduit section including:
      a second beveled surface at a first end of the second conduit section;
      a second conduit bore extending from the first end of the second conduit section to a second end of the second conduit section,
         the second conduit bore including:
            a second interior beveled surface proximate the first end of the second conduit section, and
            a second inner surface spaced from the first end of the second conduit section by the second interior beveled surface,
         the second interior beveled surface and the second inner surface at least partially defining a second fluid passageway, and
         the first end of the first conduit section being coupled to the first end of the second conduit section to fluidly connect the first fluid passageway and the second fluid passageway,
      a second surface circumscribing the second conduit bore,
         the second interior beveled surface extending from the second surface to the second inner surface,
         the first beveled surface being configured to abut the second beveled surface,
         the second beveled surface extending between the second surface and an exterior surface of the second conduit section,
         the second surface being between the second beveled surface and the second interior beveled surface,
         the second beveled surface and the second interior beveled surface being on opposite sides of the second surface,
         the first beveled surface and the second interior beveled surface being on opposite sides of the second surface, and
         the seal seat being between the first beveled surface and the first interior beveled surface, and
      a second edge located between the second surface and the second interior beveled surface;

a seal disposed between the first surface and the second surface,
the seal resting on or being inserted into the seal seat, and
an entirety of the seal being recessed from the first edge and the second edge; and
a coating applied to the first interior beveled surface and to the second interior beveled surface.

2. The fluid system of claim 1, wherein the first inner surface and the second inner surface are substantially free of the coating.

3. The fluid system of claim 1, wherein
the first conduit section includes an exterior surface having a threaded portion located proximate the first end of the first conduit section, and
the second conduit section includes the exterior surface having a flange proximate the first end of the second conduit section.

4. The fluid system of claim 3, further comprising a nut including threading that corresponds with the threaded portion of the first conduit section and a surface configured to abut the flange of the second conduit section.

5. The fluid system of claim 1, wherein the coating is a metal alloy.

6. The fluid system of claim 1,
wherein includes at least one of tungsten carbide, cobalt, or chromium, and
wherein the coating has a thickness between 0.001 inches and 0.009 inches.

7. The fluid system of claim 1, wherein
the first edge is rounded or chamfered, and
the second edge is rounded or chamfered.

8. The fluid system of claim 1, wherein a first diameter proximate the first end of the first conduit section is greater than a second diameter proximate the first inner surface.

9. The fluid system of claim 1, wherein the fluid system includes a swing check valve that includes the first conduit section.

10. A hammer union comprising:
a first conduit section including:
a first beveled surface at a first end of the first conduit section;
a cylindrical surface;
a first conduit bore including:
a first interior beveled surface, and
a first inner surface,
a first surface circumscribing the first conduit bore,
the cylindrical surface being between the first surface and the first beveled surface, and
the cylindrical surface and the first surface forming a seal seat, and
a first edge located between the first surface and the first interior beveled surface;
a second conduit section including:
a second beveled surface at a first end of the second conduit section;
a second conduit bore including:
a second interior beveled surface, and
a second inner surface,
a second surface circumscribing the second conduit bore,
the first beveled surface being configured to abut the second beveled surface,
the second beveled surface extending between the second surface and an exterior surface of the second conduit section,
the second surface being between the second beveled surface and the second interior beveled surface,
the second beveled surface and the second interior beveled surface being on opposite sides of the second surface,
the first beveled surface and the second interior beveled surface being on opposite sides of the second surface, and
the seal seat being between the first beveled surface and the first interior beveled surface, and
a second edge located between the second surface and the second interior beveled surface;
a seal interposed between the first conduit section and the second conduit section,
the seal resting on or being inserted into the seal seat, and
an entirety of the seal being recessed from the first edge and the second edge; and
a thermal coating applied to at least one of the first interior beveled surface or the second interior beveled surface.

11. The hammer union of claim 10, wherein
the first conduit section further includes an exterior surface having a threaded portion, and
the second conduit section further includes the exterior surface having a flange.

12. The hammer union of claim 11, further comprising a nut including threading that corresponds with the threaded portion of the first conduit section and a surface configured to abut the flange of the second conduit,
wherein the nut is configured to draw the first conduit and the second conduit towards each other.

13. The hammer union of claim 10, wherein the thermal coating is a metal alloy formed from a powdered metal alloy comprising at least one of tungsten carbide, cobalt, or chromium.

14. The hammer union of claim 10, wherein the thermal coating is further applied to at least one of the first surface or the second surface.

15. The hammer union of claim 10, wherein the first conduit bore and the second conduit bore are substantially free of the thermal coating.

16. The hammer union of claim 10, wherein the thermal coating is a thermal spray coating that is applied using a high velocity air fuel thermal spray process.

17. A fluid system comprising:
a conduit section including:
a beveled surface at a first end of the conduit section;
a cylindrical surface;
a conduit bore extending from the first end of the conduit section to a second end of the conduit section,
the conduit bore including:
an interior beveled surface proximate the first end of the conduit section, and
an inner surface spaced from the first end of the conduit section by the interior beveled surface,
the interior beveled surface and the inner surface at least partially defining a fluid passageway;
a surface circumscribing the conduit bore,
the cylindrical surface being between the surface and the first beveled surface,
the cylindrical surface and the surface forming a seal seat, and
the seal seat being between the beveled surface and the interior beveled surface; and
an edge located between the surface and the interior beveled surface;

a seal resting on or being inserted into the seal seat,
an entirety of the seal being recessed from the edge; and
a coating applied to the beveled surface.

18. The fluid system of claim 17, wherein the coating comprises a metal alloy deposited via a thermal spray.

19. The fluid system of claim 18, wherein the thermal spray comprises a high velocity air fuel coating.

20. The fluid system of claim 17, wherein the conduit section is a first conduit section that is configured to be joined to a second conduit section via a hammer union connection.

\* \* \* \* \*